Patented Oct. 29, 1935

2,019,365

UNITED STATES PATENT OFFICE 2,019,365

FOOD COMPOUND

Teresa Thompson Speed, New York, N. Y.

No Drawing. Application January 19, 1934,
Serial No. 707,334

11 Claims. (Cl. 99—11)

The object of my invention is the production of a food compound to be used in the making of foods and confectionery. My invention relates to cooking or confectionery material and is a mixture of dry, finely divided cooking caramel and dry granulated sugar. Reference to modern cook books, under the subject of caramel, will instruct the cook to heat sugar until it melts and turns to candy and to continue cooking until the melted mass turns brown, bubbles and puffs a characteristic smell of the smoky steam of caramel, and to take the vessel off the fire when the odor is reached, which experience will teach to associate with the exact caramel flavor desired, which normally is of more or less sweet flavor but which by over-cooking may be changed to a different kind of caramel having a decidedly bitter taste with very little sweetness. The cookbooks then instruct that the heated mass, which is sometimes almost as hot as melted solder, (approximately 483° F.) is poured into hot water, hot milk or other culinary solvent, or vice versa. However, little or nothing is usually said of the danger of the sputtering hot mass and the house-filling odor of the smoky steam, or the extreme difficulty of dissolving the mass or cleaning the cooking vessel, especially if the caramel has become partly burned to the bottom of the vessel as may easily happen because of the extremely viscous quality of the hot liquid.

As contrasted with this, my invention seeks to furnish the cook with a ready-to-use mixture of sugar and cooking caramel in a ready prepared and easily dissolvable form, and to avoid the difficulties encountered in the making and using of cooking caramel in the ordinary way as described in cook-books.

It is a well-known fact that when sugar is melted and then cooked past the candy point it becomes more greedy to become wet and sticky, that is, more hygroscopic; and if cooked to a brown caramel melt and poured out on a cold plate to chill, it quickly becomes a brittle, glassy material, easily broken but requiring longer time to dissolve; in fact, it becomes progressively so as it is carried further toward the darker brown variety and toward the bitter caramels which are not hygroscopic and are hard to dissolve, and are usable only for entirely different purposes, such as coffee adulteration, brandy coloring, etc.

Now, I have found that if the aforesaid hygroscopic brittle, glassy material is ground up while it remains dry and brittle (and hence preferably fresh), it may be ground to a fine or even impalpable powder; but if it is left in the ordinary moist air even for a few minutes, the unground mass becomes sticky and the ground-up powder quickly cakes, for it is very greedy of the moisture in the air and, because the grains have sharp edges and corners, and great surface area per unit volume, the powder becomes a sticky and unmanageable mass, and even if it is quickly put into milk or water it is likely to form a sticky blob which is slow to dissolve; and then again is also troublesome if the attempt is made to add the caramel powder, even when fresh and dry, to a cake or batter dough.

My discovery is that if I mix the (preferably fresh) dry ground cooking caramel with dry granulated sugar, I overcome the difficulty attending the attempt to use the ground or pulverized caramel directly; for the sugar-caramel mixture dissolves easily and can be easily mixed in batter or dough, just like sugar, or may be dissolved in cold water, milk or the like. In fact, the solution of the problem of how to make a ready-to-use cooking caramel preparation is to mix the caramel, in a dry, finely powdered form, with dry granulated sugar, preferably the pure and non-moisture-greedy kind which is used in commerce, as distinguished from the brown and light-brown sugars, although it may be that if extreme care were used to make a light-brown sugar extremely dry it might be used, but the product will be inferior and would tend to cake more easily under some conditions, as for instance prolonged exposure to the intense heat of tropical warehouses, even when enclosed in air-tight containers.

My composition, then, consists of dry, finely-divided cooking caramel which is very hygroscopic, mixed with dry non-hygroscopic sugar, preferably one of the so-called "white" sugars, preferably the ordinary commercial grade known as "granulated".

When I use the term "granulated sugar", I mean the type of substance commonly known by that name, regardless of whether it has been pulverized after making or not. I will now describe the steps of the process by which I make my composition, which, to save time, I will call Caramel Granny, i. e., caramel and granulated sugar.

First: I cook granulated sugar, preferably, although I may use brown sugar or any other pure-food raw material which is convertible into caramel, provided the resulting caramel is capable of being finely sub-divided. I cook the sugar or other suitable material in a suitable vessel until the mass is a bubbling, steaming and smoking liquid of brown color; and I find I can control the taste and flavor of the finished product by the appearance and the smell of the smoke and steam that rises from the vessel. I find that the flavor and quality of the caramel depend both upon the temperature and time of cooking, and it is sufficiently easy to learn how to judge by experience the test of the finished product by the aforesaid indications.

Second: I quickly chill the melted mass, as, for example, by pouring it in a thin stream in stripes over a cool plate so that it is quickly chilled into brittle streaks or long plates of brittle glassy appearance. This I do in a dry, cool atmosphere, and the temperature of the plate must be above the dew point of the atmosphere.

Third: These glassy strips of caramel may be immediately enclosed in air-tight or very dry containers, but the need of keeping moisture away is so imperative that I prefer to immediately grind the caramel to powder preferably as fine or finer than the granulated sugar. However, it will be obvious from inspection of ordinary commercial granulated sugar that it commonly comprises grains of many widely different sizes. In a single sample, the larger grains may be five or ten times the size of the smallest grains, and the smallest grains may be of approximately the same size as the more uniform grains that will be found in what is commercially known as "powdered" sugar. So it will be understood that the sizes of the grains of the ground caramel with respect to each other or with respect to the sugar may be capable of wide variations without departing from the spirit of my invention; and the main reason why it will be found preferable not to make the grains of the caramel powder too large is that caramel dissolves more slowly than sugar, and if the caramel grains are too large they may require an undesirably long time for dissolution when the Caramel Granny is put to practical use. Great care must be taken to keep the mill and all its parts free from access to moisture, and also so to operate it that it will not get hot from friction, because the freshly ground caramel is extremely greedy for moisture in the air or elsewhere; and also is liable to melt and gum the mill if too much frictional heat is developed.

Fourth: It is extremely important that the finely divided caramel be mixed with dry granulated sugar or other suitable separating material; and if I have taken sufficient pains to grind the caramel so that it is dry and loosely pulverant, the presence of the dry granulated sugar mixed in with it either during or after grinding confers on the mixture the desirable property of being able to be kept in air-tight containers without becoming sticky, even on prolonged exposure to the severest climatic conditions. The mixture is even able to stand open for short periods of time, if the atmosphere is very dry and cool, as for example in cold dry weather or in a mechanical refrigerator, although in general I advise the use of the mixture as shortly after the opening of the air-tight container as is convenient. The presence of the granulated sugar grains, acting as separators between the caramel particles, also confers on the compound the ability to dissolve readily under culinary conditions and to mix without becoming sticky or gummy, or otherwise difficult to use. Possibly this is because the sugar, though practically non-hygroscopic, is far more quickly soluble in the liquid. In this connection, it is to be noted that a substance may be very hygroscopic and very soluble, without being quickly soluble.

Fifth: After the mixing of these two constituents, and using the same care with respect to moisture or heat, or both, I enclose the mixture in suitable, air-tight containers, such as the ordinary air-tight cans used for food products.

When so made, and so canned, I have discovered that the mixture does not soften and cake in the cans, but can be heard to be free and loose by shaking a partly filled can, even when kept for long periods in storage at temperatures as high as an Arizona summer.

I believe these steps, when carried out in a mechanized equivalent of a dry kitchen, and with the care about moisture and about heat, and with the celerity of operation I have described, (or other mechanical equivalent), constitute a new and useful invention and that the resulting product is a new and useful and valuable article of manufacture.

The exact proportions of dry, ground caramel to dry granulated sugar may be varied in wide limits. A product for use in tropical countries may well be made with a larger proportion of dry granulated sugar than if it is to be shipped to northern, high and dry districts, for example, if such differentiation were thought desirable; this differentiation being, however, more from a desire to delay the early caking of the contents of an opened can in case of the tropical variety, and with a view of furnishing a more concentrated form for the northern districts where freight rates are higher; but from the ordinary trade standpoint, I find that a mixture of just enough caramel to give a good, full caramel flavor to a recipe when the mixture is used in a recipe as a substitute for the plain granulated sugar called for in an unflavored product, is the ideal form; at least this mixture seems to meet with most approbation. To be more explicit, I take, for example, from Ida Bailey Allen's Modern Cook Book (Garden City Publication, New York 1932), page 650, where she describes how the recipe for custard pie must be modified in order to make caramel custard pie, as follows:

"Caramel Custard Pie: Observe the directions for custard pie with this exception—melt one-half of the sugar in a frying pan until it is the colour and consistency of maple syrup. To this add the milk, letting the two cook together until the sugar is melted; cool, and finish as for plain custard pie, flavouring the mixture with one-fourth teaspoonful vanilla."

The above recipe takes time and trouble, whereas all or half of the sugar called for in the original recipe can be Caramel Granny according to the richness of flavor desired and can be mixed in the cold milk, without heating the milk or making the caramel.

Or, on page 624 of the same cook-book:

"Caramel Sauce:
1¼ cupfuls sugar
2¼ cupfuls boiling water
½ tablespoonful butter
1 tablespoon cornstarch
   Few grains salt
½ teaspoonful vanilla Caramelize the sugar in a small frying pan. When it is nearly all liquefied and the colour of maple syrup, add the water, boil until the sugar is dissolved, then thicken with the cornstarch and butter creamed together. Add the vanilla and salt and use hot or cold."

With Caramel Granny, the sauce can be made more easily, and flavor controlled by making the sauce without sugar and then adding Caramel Granny until the exact richness is reached; Caramel Granny being, as hereinbefore described, the name of the product of my invention, that is, a mixture of caramel and granulated sugar. I prefer to make a mixture that has just enough caramel to give a full caramel flavor to the confection when used in place of other sweetening. It is, of course, optional with the cook, in case a more delicate flavor of caramel is desired, to use say one-half Caramel Granny and one-half plain sugar; but this is, of course, quite obvious to any cook.

I consider the mixture just described (one-half ground caramel and one-half granulated sugar) is a good lower limit of caramel strength and I use such a mixture as the preferable one for ordinary household use; but for use in bakeries or hotels a much stronger mixture may be found preferable; and in such cases I use only enough sugar to maintain the non-caking and easy mixing quality that characterizes my mixture.

Having described a useful mixture of caramel and sugar, I may add powdered cocoa or chocolate or the like, and quickly can the mixture so that a ready-to-use canned material suitable for making chocolate-caramel confections may be available to the cook.

I believe the reason for the success of my invention is the use of a substance mingled with the powdered caramel which is in itself so soluble that it prevents the caramel particles from sticking together when the attempt is made to dissolve them, by the fact that the sugar grains, as it were, dissolve in between the caramel grains. Obviously, any other suitable harmless food-stuff that would so act in the joint capacity of a non-hygroscopic, easily-soluble separator of the caramel grains while in the can and also function as a readily dissolvable intersticial material in the process of solution is within the scope of my invention.

Thus I give the rule that in the case of mixtures of one or more food-stuffs in addition to the caramel, the amount of sugar must be so adjusted as to preserve both the non-caking quality while in the container and the adequate soluble intersticial character of the mixture when it is attempted to dissolve it.

Referring again to the steps of mixing and canning, in some cases there are advantages in proceeding in the following order as lessening the chances of having moisture enter the mixture during manufacture. I grind the caramel and deliver a definite amount into the final container and then deliver a definite amount of dry sugar into the said container; and next, I close or seal the container air-tight and roll or shake the container to effect the mixing therein.

I claim:

1. A mixture of dry, finely sub-divided caramel of the highly hygroscopic, water-soluble type, and a more quickly soluble, less-hygroscopic separator including sugar sufficiently dry not to cake when the mixture is kept in a dry air-tight container under commercial conditions.

2. A mixture of dry, finely sub-divided caramel of the highly hygroscopic type and dry granulated sugar the average size of the caramel grains being at least as small as those of the sugar.

3. A mixture of dry, finely divided caramel of the highly hygroscopic type with at least half its volume of dry granulated sugar.

4. A mixture of dry, finely divided caramel of the highly hygroscopic type with at least an equal volume of dry granulated sugar.

5. A mixture of finely divided caramel of the highly hygroscopic type and granulated sugar, sufficiently dry not to cake when kept in a dry air-tight container under commercial conditions.

6. A process of preparing cooking caramel in marketable form, which consists in making a dry caramel of the highly hygroscopic type, granulating or pulverizing the caramel in a dry atmosphere, mixing it with dry granulated sugar and hermetically sealing the mixture.

7. A soluble mixture comprising dry granulated caramel of the highly hygroscopic, water-soluble type, and a dry sugar more readily soluble than said caramel.

8. A process of preparing cooking caramel in marketable form, which includes melting a suitable sugar material and cooking it to the point of producing a liquid caramel of the highly hygroscopic type; reducing the temperature to check the reaction and minimize production of caramels of the bitter, less soluble type, and to solidify the caramel as a dry, brittle, glassy, highly hygroscopic substance; and, while dry, grinding it to powder while protecting it from moisture and preventing heating of the grinding apparatus; and, while dry, mixing the powder with dry granulated sugar.

9. A process of preparing cooking caramel in marketable form, which includes melting a suitable sugar material and cooking it to the point of producing a liquid caramel of the highly hygroscopic type; reducing the temperature to check the reaction and minimize production of caramels of the bitter, less soluble type, and to solidify the caramel as a dry, brittle, glassy, highly hygroscopic substance; and, while dry, grinding it to powder while protecting it from moisture and preventing heating of the grinding apparatus; and, while dry, mixing the powder with dry granulated sugar; and while the mixture is dry, hermetically sealing it.

10. A process of preparing cooking caramel in marketable form, which includes melting a suitable sugar material and cooking it to the point of producing a liquid caramel of the highly hygroscopic type; reducing the temperature to check the reaction and minimize production of caramels of the bitter, less soluble type, and to solidify the caramel as a dry, brittle, glassy, highly hygroscopic substance; and, while dry, grinding it to powder while protecting it from moisture and preventing heating of the grinding apparatus; and, while dry, mixing the powder with dry granulated sugar, in the proportions of one part of the sugar to not more than three parts caramel.

11. A process of preparing cooking caramel in marketable form, which includes melting a suitable sugar material and cooking it to the point of producing a liquid caramel of the highly hygroscopic type; reducing the temperature to check the reaction and minimize production of caramels of the bitter, less soluble type, and to solidify the caramel as a dry, brittle, glassy, highly hygroscopic substance; and, while dry, grinding it to powder while protecting it from moisture and preventing heating of the grinding apparatus; and, while dry, mixing the powder with dry granulated sugar, in the proportions of one part of the sugar to not more than three parts caramel; and while the mixture is dry, hermetically sealing it.

TERESA THOMPSON SPEED.